PRESSURE METERING VALVE
Original Filed Aug. 13, 1965 2 Sheets-Sheet 1
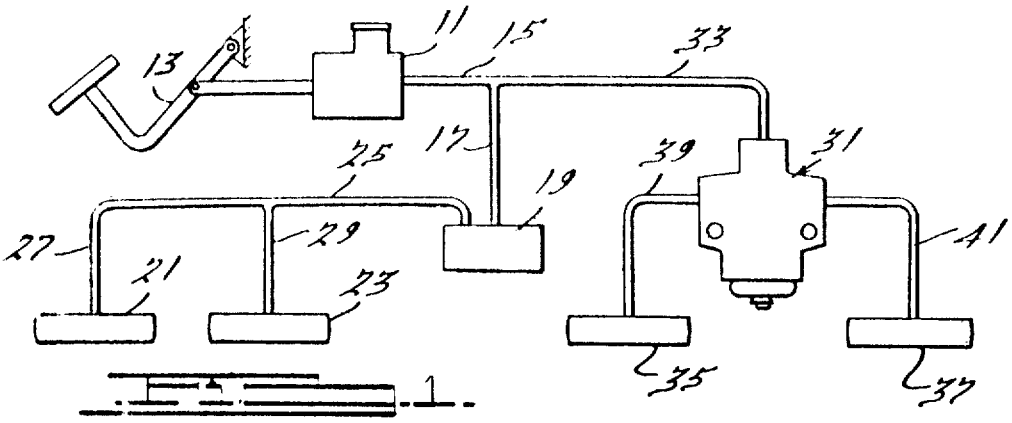
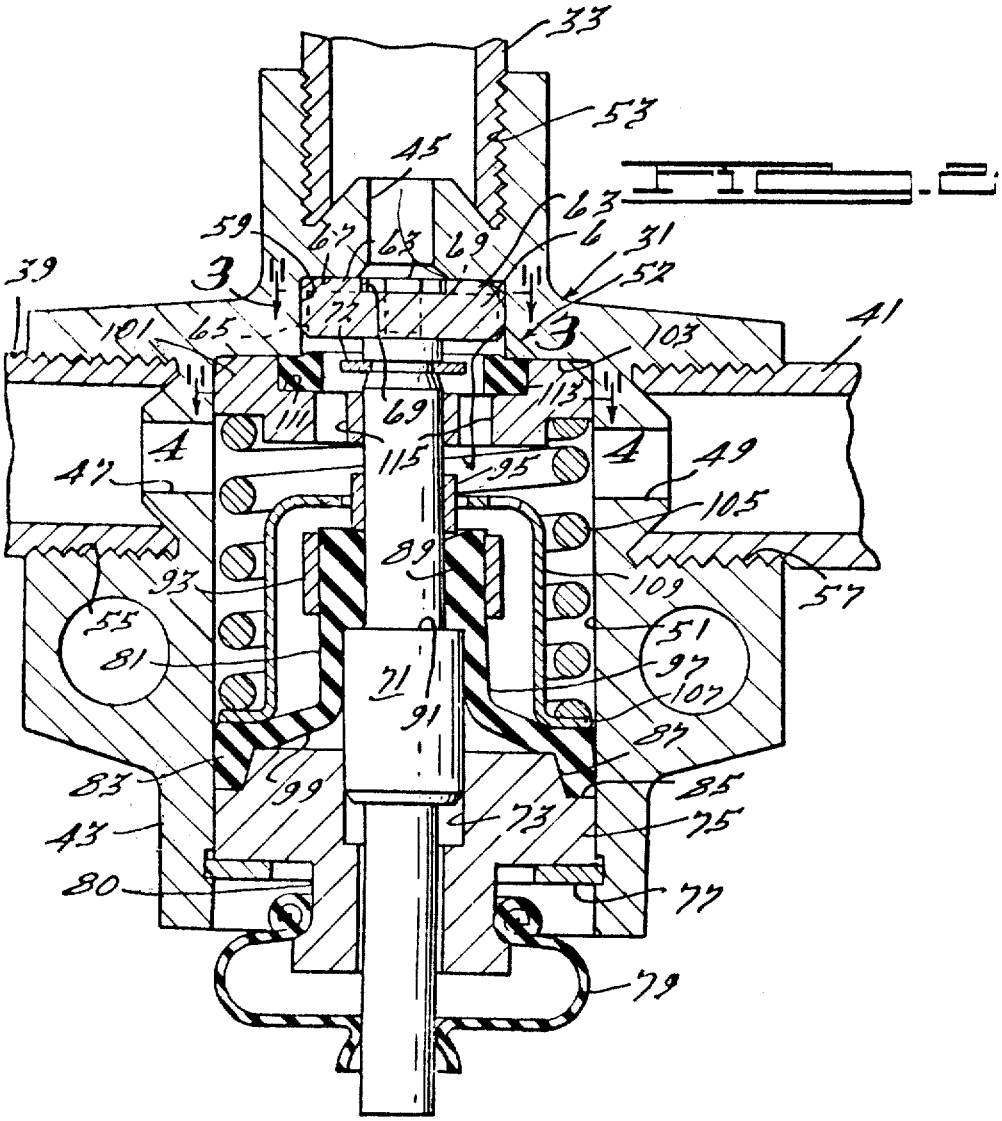

PRESSURE METERING VALVE

Original Filed Aug. 13, 1965 2 Sheets-Sheet 2

United States Patent Office

Re. 28,253
Reissued Nov. 26, 1974

28,253

PRESSURE METERING VALVE

William Stelzer, Milford, Mich., assignor to Kelsey-Hayes Company, Romulus, Mich.

Original No. 3,278,241, dated Oct. 11, 1966, Ser. No. 479,379, Aug. 13, 1965. Application for reissue Aug. 4, 1971, Ser. No. 169,149

Int. Cl. B60T *8/26*

U.S. Cl. 303—6 C 39 Claims

Matter enclosed in heavy brackets [ ] appears in the original patent but forms no part of this reissue specification; matter printed in italics indicates the additions made by reissue.

ABSTRACT OF THE DISCLOSURE

*A valve having an inlet connected to a master cylinder and an outlet connected to the disc brake cylinders at one set of wheels of an automotive vehicle having drum brakes at another set of wheels wherein the valve has a differential pressure responsive valve means open when the brake pedal is not applied and adapted when closed to block communication between said inlet and outlet and constructed to close during pedal application when a first pressure level insufficient to cause actuation of the disc brake cylinders is reached in said master cylinder and to open when a second pressure level is reached in said master cylinder at least sufficient to overcome the force of the return springs in the drum brakes whereby to prevent pressurization of said disc brakes above said first level until said second pressure level is reached in said master cylinder. The valve thereafter alternately opens and closes at master cylinder pressures above the second pressure level smoothly increasing the fluid pressure at the disc brakes at a greater rate than master cylinder pressure and remains open at a third level of master cylinder pressure where it has no pressure limiting effect.*

This invention relates to hydraulic brake systems for automotive vehicles, and particularly to an improved metering valve adapted to delay pressurization of the front wheel brakes where the vehicle front wheels are equipped with disc brakes and the rear wheels with drum brakes.

When disc brakes are applied, they produce a brake torque almost as soon as hydraulic pressure is developed in the system whereas drum brakes require a substantial hydraulic pressure in the system before they produce a brake torque. Drum brakes utilize relatively heavy return springs, the force of which must be overcome before the shoes contact the drum while disc brakes use either no return springs or very light return springs. In either case, the disc brakes require only a relatively small pressure at their brake cylinders to cause actuation thereof.

If a vehicle is provided with drum brakes on its rear wheels and disc brakes on its front wheels and no metering valve for the disc brakes is employed, the disc brakes will develop high braking torque during a light brake application. As a result the linings of the disc brake shoes will tend to wear out prematurely. Furthermore, the front brakes will frequently be applied inadvertently by drivers who rest their foot on the brake pedal or "ride" the brake pedal. This can easily cause excessive heating of the disc brakes without the driver even becoming aware of the situation.

In view of the foregoing problems, it has been proposed that a valve be interposed between the master cylinder and the disc brake cylinders which will retard the delivery of fluid pressure to the disc brake cylinders during pedal application until master cylinder pressure reaches a predetermined level. Preferably, this level is equal to or greater than the pressure at which the force of the drum brake return springs will be overcome, thereby causing the disc brakes to produce a braking torque at the same time or after the drum brakes and preventing inadvertent application of the disc brakes. The pressure limiting effect of such a valve should be gradually eliminated as master cylinder pressure is increased for maximum efficiency to obtain the highest practical braking torque per unit of input energy. Importantly, this valve should permit fluid communication between the master cylinder and disc brakes when the brake pedal is not applied to relieve pressure at the brake cylinders when the pedal is released and to permit expansion of the heated hydraulic fluid at the brake cylinders when the brakes are not energized.

By reason of their construction, it has sometimes been possible to "beat" prior metering valves. Stated another way, pressure fluid could be gotten past the metering valve to apply the disc brakes prematurely as, for example, during a slow or light application of the brake pedal. This problem is especially apparent when a driver "rides" the brake pedal as mentioned above.

The main objects of the present invention, therefore, are the provision of a metering valve for use in an automotive vehicle hydraulic brake system having disc brakes at one set of wheel and drum brakes at the other which will delay delivery of fluid pressure to the disc brakes during pedal application sufficient to actuate them and cause a braking torque under both slow and fast brake pedal application until a predetermined master cylinder pressure is reached and which will thereafter smoothly increase the fluid pressure delivered to the disc brakes at a faster rate than master cylinder pressure is increased so that it will have no pressure limiting effect when master cylinder pressure reaches a second predetermined high level.

Further objects include the provision of a metering valve of the above character which permits fluid communication between the master cylinder and disc brakes when the pedal is not applied and which is of relatively simple construction and adapted to simplify the overall hydraulic conduit system.

Still further objects of the present invention are the provision of a metering valve of the above character which is relatively inexpensive to manufacture, rugged in construction and reliable in operation.

Other objects and advantages of the present invention will become more apparent from the following detailed description taken in conjunction with the drawings in which:

FIGURE 1 is a diagrammatic view illustrating a hydraulic braking system embodying the metering valve of the present invention;

FIG. 2 is a longitudinal sectional view through the metering valve of the present invention;

Figure 3:
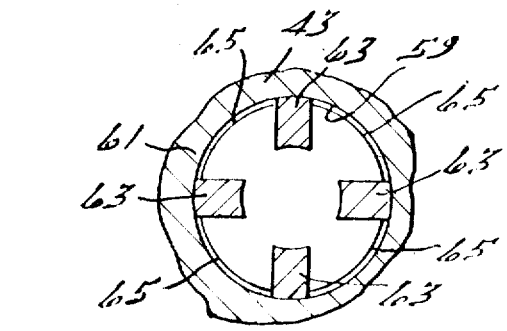
FIG. 3 is a sectional view of the structure of FIG. 2 taken along the line 3—3 thereof.

Broadly described, the present invention includes a valve having an inlet connected to the master cylinder and an outlet connected to the disc brake cylinders at one set of wheels of an automotive vehicle having drum brakes at another set of wheels wherein the valve has a differential pressure responsive valve means open when the brake pedal is not applied and adapted when closed to block communication between said inlet and outlet and constructed to close during pedal application when a first pressure level insufficient to cause actuation of the disc brake cylinders is reached in said master cylinder and to open when a second pressure level is reached in said master cylinder at least sufficient to overcome the force of the return springs in the drum brakes whereby to prevent pressurization of said disc brakes above said first level until said second pressure level is reached in said master cylinder. The valve thereafter alternately opens and closes at master cylinder pressures above the second pressure level smoothly increasing the fluid pressure at the disc brakes at a greater rate than master cylinder pressure and remains open at a third level of master cylinder pressure where it has no pressure limiting effect.

Referring now more specifically to the drawings, FIG. 1 is a diagrammatic illustration of a motor vehicle hydraulic braking system incorporating the present invention. As shown therein, a master cylinder 11, controlled by a brake pedal 13, is connected by conduits 15, 17 to a proportioning valve 19 in turn connected to rear wheel brake cylinders 21, 23 by conduits 25, 27, 29. The proportioning valve 19 may be the type disclosed in my copending application Serial No. 386,697, filed July 31, 1964, and owned by the assignee of the present application, adapted to reduce the pressure to the rear wheel cylinders 21, 23 to compensate for dynamic weight transfer during rapid vehicle deceleration. The master cylinder 11 is connected to a metering valve 31, embodying the present invention, by the conduit 15, and a conduit 33. As shown, the metering valve 31 is connected to a pair of front wheel cylinders 36, 37 by conduits 39, 41, respectively, and forms the required T-connection between the conduit 33 and the conduits 39, 41.

The metering valve 31, shown in detail in FIG. 2, includes a body 43 having an inlet opening 45 and a pair of outlet openings 47, 49 communicated by a generally cylindrical bore 51. A pressure responsive valve assembly, indicated generally at 52, is adapted to control communication between the inlet 45 and the outlets 47, 49. The inlet opening 45 has an enlarged threaded outer end 53 receiving the end of the conduit 33 and the outlet openings 47, 49 have enlarged threaded outer ends 55, 57 receiving the ends of the conduits 39, 41 respectively.

The bore 51 has a reduced diameter inner end 59 adjacent the inlet opening 45 and in which a valve disc 61 forming a part of the valve assembly 52 is movably disposed. The disc 61 is generally cylindrical in cross-section and has a plurality of arcuately spaced radial projections 63 along the inner face thereof and extending slightly beyond the disc outer periphery. The outer ends of the projections 63 are closely but slidably received in the reduced bore 59 and together therewith form a plurality of arcuately restricted passageways 65 through which hydraulic fluid can pass (FIG. 3). The projections 63 are positioned to engage an end wall 67 of the reduced bore 69 and together therewith form radial passageway 69 which communicate the inlet opening 45 and the axial passageways 65.

The metering valve body 43 is oriented as shown in FIG. 2 so that the valve disc 61 tends to fall by gravity downwardly and away from the reduced bore end wall 67. However, a push rod 71 extends slidably through a valve plate 101 and normally engages the lower end of the valve disc 61 and holds it in place against the end wall 67. A snap ring 72 on the push rod 71 holds the push rod and valve plate 101 together during assembly. As shown, the push rod 71 is slidably received in an opening 73 formed in a plug 75 positioned in the bore 51 with its outer end exposed to atmospheric pressure. A snap ring 77 removably retains the plug 75 within the bore 51 and a flexible boot 79 surrounds a reduced end 80 of the plug 75 and the outer end of the push rod to keep dirt, grease or other foreign matter from gaining access to the plug opening 73. A diaphragm 81, formed of molded flexible rubber or other suitable material, has an outer flanged end 83 snugly received in an annular groove 85 formed between the wall of the bore 51 and a reduced inner end portion 87 of the plug 75. This flanged end 83 forms a seal preventing the flow of fluid past the outer periphery of the plug 75 and positions the diaphragm 81 within the bore 51. The inner end of the diaphragm 81 has a radially inwardly extending flange 89 snugly fitted over and gripping the push rod 71. The flange 89 is held on the push rod 71 adjacent a radial shoulder 91 by a split clamp 93 and by a retaining ring 95.

The diaphragm flanges 83, 89 are interconnected by intervening somewhat thinner and more flexible axial and radial sections 97, 99 respectively. The diaphragm 81 is molded or otherwise suitably formed to the configuration illustrated and normally holds the push rod 71 in the position illustrated in FIG. 2 where it holds the projections 63 on the valve disc 61 against the end wall 59. However, when a fluid force within the bore 51 acts against the diaphragm 81, the radial section 99 can move against the plug 75 and the push rod 71 downwardly within the bore 51 whereupon the disc 61 falls downwardly away from the end wall 67 under the force of gravity. When the external force is removed, the resilient diaphragm 81 returns to its natural configuration and the parts assume the positions shown in FIG. 2.

The valve plate 101 is positioned within the bore 51 and is held against a radial shoulder 103, formed between the bore 51 and the reduced bore 59, by one end of a compression spring 105. The other end of the compression spring 105 engages a flange 107 formed on a metal retainer 109 and engaging the diaphragm outer flange 83. This retainer engages the diaphragm flange 89 during assembly of the parts and holds the spring 105 caged against the valve plate 101. The valve plate 101 has a recess 111 formed in its inner or upper end and adapted to receive an annular seal 113. With the parts in their positions illustrated in FIG. 2, the seal 113 engages the shoulder 103 and prevents the flow of fluid therepast. However, the valve plate 101 has a plurality of axial openings 115 therethrough so that fluid entering the housing inlet 45 from the master cylinder 11 and flowing through the passageways 69, 65 around the valve disc 61 passes through the openings 115 in the valve plate 101 and enters the bore 51.

To assemble the valve, the disc 61 is first positioned in the reduced bore 59. The diaphragm 81 is placed on the push rod 71 and held thereby the rings 93, 95. Thereafter, the retainer 109 is placed against the diaphragm flange 89 and the spring 105 located with one end against the retainer. The plate 101 having the seal 113 in the recess 111 is then placed on the push rod 71 caging and compressing the spring 105, and the snap ring 72 locked in place after which this entire unit is positioned in the bore 51. The plug 75 is slid into the bore behind and receving the diaphragm flange 83 to compress the spring 105 and release the retainer from abutment with the diaphragm flange 89. To complete the assembly, the snap ring 77 is pointed to hold the plug 75 in place and the boot 79 placed on the plug end 80 and on the push rod.

Before actuation of the brake pedal 13 to deliver pressure fluid from the master cylinder 11 to the metering valve 31, the parts are in the positions illustrated in FIG. 2, the diaphragm 81 holding the push rod 71 against the valve disc 61 so that its projections 63 abut the end wall 67 and the valve 52 is open. When the brake pedal 13 is initially actuated, fluid is delivered from the master cylinder 11 through the conduits 15, 33 to the metering valve inlet opening 45. From there, fluid flows through the passageways 69, 65 and the openings 115 in the valve plate 101 and into the bore 51 where it acts upon the diaphragm 81 biasing the flange 89 downwardly and the radial section 99 against the plug 75. This moves the push rod 71 downwardly at some master cylinder pressure level and away from the valve disc 61 whereupon the disc falls by gravity away from the end wall 67 and against the seal 113. Manifestly, this first level of master cylinder pressure which causes the push rod 71 to move downwardly is insufficient to actuate the brake cylinders 35, 37. With the parts in this position, the valve 52 is closed and further fluid communication between the inlet 45 and the outlets 47, 49 and therefore the master cylinder 11 and the front wheel brake cylinders 35, 37 is blocked.

Figure 4:
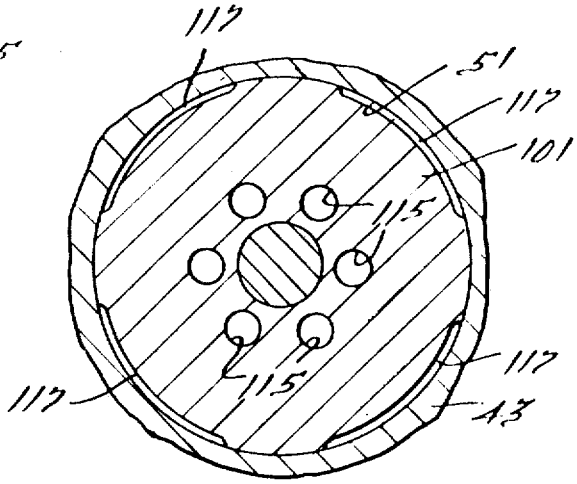
FIG. 4 is a sectional view of the structure of FIG. 2 taken along the line 4—4 thereof.

As master cylinder pressure increases with further pedal pressure, it acts against the valve disc 61 and the valve plate 101, tending to move them downwardly within the body 43. This fluid pressure force is opposed by the force of the spring 105 and by the force exerted on the plate 101 by the small amount of fluid trapped within the bore 51 when the valve disc 61 seats against the seal 113. The force imposed by the fluid trapped in the bore 51 at this point is comparatively small when compared with the force of the spring 105 and may be neglected here. Thus, the force of the spring 105, being substantially a constant, is overcome at a second predetermined level of master cylinder pressure to move both the valve plate 101 and the valve disc 61 downwardly within the valve body 43 and the seal 113 away from the shoulder 103 thereby opening the valve 52. The valve plate 101, as seen in FIG. 4, is grooved at its outer periphery forming a plurality of angularly spaced passageways 117 so that when the valve 52 is opened in this manner, pressure fluid can pass from the inlet 45, between the disc 61 and end wall 67, along the passageways 65 in the disc 61, between the valve plate 101 and the shoulder 103, through the passageways 117 and into the bore 51. The outlets 47, 49 are open to the bore 51 so that when the valve 52 opens as described, fluid flows through the conduits 39, 41 and pressurizes the front wheel brake cylinders 35, 37. This is the point of initial actuation of the front wheel brake cylinders and is determined by the master cylinder or pressure at the inlet 45 required to overcome the force of the spring 105. This second master cylinder pressure level is at least equal to or greater than that required to overcome the force of the heavy return springs utilized in the rear wheel drum brakes. Thus, premature energization of the front disc brakes is prevented and a braking torque is not developed at the disc brakes at least until one is developed at the rear drum brakes.

When the valve 52 opens as described, the master cylinder pressure or pressure at the inlet 45 develops a force on the valve disc 61 and valve plate 101 just sufficient to overcome the force of the spring 105. Of course, when the valve 52 opens, fluid enters the bore 51 from the master cylinder 11 and increases the pressure therein. This pressure acts on the valve plate 101 in a direction assisting the spring 105 and moves the plate back toward the shoulder 103 seating the seal 113 thereagainst and closing the valve 52. The valve disc 61 and plate 101 remain in this position and the valve 52 is closed to block communication between the inlet 45 and outlets 47, 49 until a further increase in master cylinder or inlet pressure acting on the valve disc 61 and plate 101 is sufficient to overcome the opposing forces and reopen the valve 52. When the valve 52 reopens, pressure in the bore 51 increases further and the valve closes again. This alternate opening and closing of the valve 52 continues with increasing master cylinder pressure until the master cylinder pressure reaches a third level where it completely overcomes the force of the spring 105 and the pressure of the fluid in the bore 51. At this point, the valve 52 remains open.

When the valve 52 is closed, the pressure at the inlet 45 acts on the valve parts over a cross-sectional area determined by the means sealing radius of the seal 113. This radius is substantially midway between the reduced bore 59 and the radial outer edge of the seal 113. Assuming this area to be $A_1$ and the $P_i$ is the pressure at the inlet 45, $P_o$ the pressure within the bore 51, $A_2$ the cross-sectional area of the plug opening 73 and $F_s$ the fore of the spring 105, the forces on the valve 52 including the disc 61 and plate 101 at the point where the valve opens are represented by the following formula:

$$P_iA_1=F_s+P_o(A_1-A_2)$$

Thus, for a given increase in inlet or master cylinder pressure ($P_i$) there must be a greater increase in outlet pressure ($P_o$) so that the fluid pressure delivered to the disc brakes increases at a faster rate than master cylinder pressure. This pressure relationship holds and the valve 52 alternately opens and closes with increasing master cylinder pressure as described about until $P_o$ equal $P_i$. At this point, the force of the spring 105 is completely overcome the valve 52 remains open and has no limiting effect on the pressure delivered to the disc brakes.

When the brake pedal 13 is released, master cylinder or inlet pressure $P_i$ drops whereupon the forces on the valve plate 101 caused by $P_o$ and the spring 105 move the plate upwardly in the bore 51 and cause the seal 113 to seat against the shoulder 103. However, fluid pressure within the bore 51 is exerted upon the lower end of the valve disc 61 through the openings 115 in the valve plate 101 and causes the disc 61 to move upwardly against the end wall 67 and become unseated from the seal 113. Therefore, fluid pressure within the bore 51 is relieved through the opening 115, the passageways 65, 69 around the valve disc 61, the inlet 45 and back to the master cylinder 11. Thus, even though the push rod 71 remains in a downward position when the brake pedal 13 is released as a result of the fluid pressure in the bore 51 which acts on the diaphragm 81 and holds the diaphragm wall 99 against the plug 73, the valve disc 61 can move upwardly to open the valve 52 and relieve pressure within the bore 51 and at the front wheel brake cylinders 35, 37 when the pedal 13 is released. When this pressure is relieved, the diaphragm 81 resumes its normal molded shape and the push rod 71 moves upwardly to hold the disc 61 against the end wall 67.

The initial closing of the valve 52 described above occurs when a master cylinder pressure is developed sufficient to flex the diaphragm wall 91 and move it back against the plug 73. Since this ocurs irrespective of the rate of pedal application, the system cannot be "beat" by slow or light brake pedal application and the front wheel disc brakes cannot be prematurely applied. However, to insure that energization of the front wheel disc brakes is delayed during very rapid or heavy brake pedal application, the valve 52 additionally is responsive to rapid delivery of fluid from the master cylinder 11 as would take place during rapid pedal application. Thus, during fast brake pedal application, pressure fluid from the master cylinder 11 passes rapidly through the passageways 69, 65 around the valve disc 61. Since the axial passageways 65 are small and restrict fluid flow therethrough, a pressure drop occurs across the valve disc 61 causing the disc and the push rod 71 to move downwardly until the disc 61 seats against the seal 113. Thus, the valve 52 is closed and remains so until master cylinder pressure increases to a point where the force of the spring 105 is overcome in the manner described above. Therefore, the only difference here is in the initial closing of the valve 52.

Figure 5:
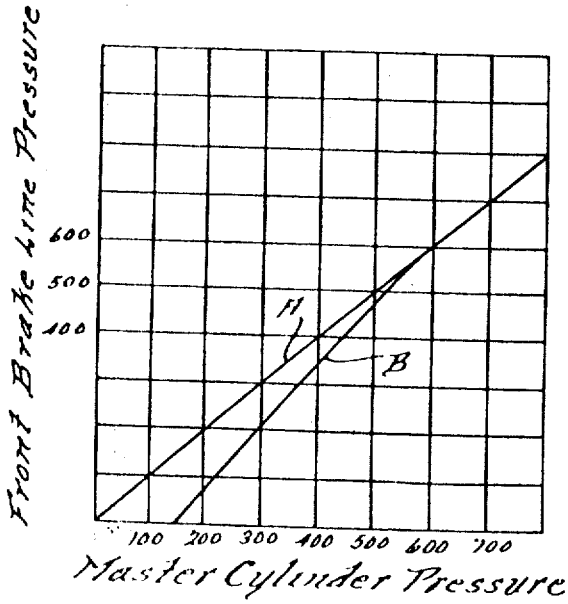
FIG. 5 is a graphical illustration of front wheel braking pressure plotted against master cylinder line pressure.

FIG. 5 is a graphical representation of the braking pressure at the front wheel cylinders 35, 37 in one typical brake system embodying the present invention. The line A represents master cylinder pressure which is also the metering valve inlet pressure as well as the pressure delivered to the rear wheel brake cylinders 21, 23. The line B represents the pressure delivered to the metering valve outlets 47, 49 and to the front wheel brake cylinders 35, 37. The valve 52 closes by movement of the diaphragm 81 and push rod 71 at a relatively low master cylinder pressure such as, for example, 15 p.s.i. This pressure is inadequate to energize the disc brake cylinders and for this reason, the graph illustrates that no pressure is delivered to the cylinders 35, 37 at this point. In this representative system, the valve 52 remains closed until master cylinder pressure reaches about 150 p.s.i. which is the pressure needed at the inlet 45 to overcome the force of the spring 105. This pressure generally is more than that required to overcome the force of the drum brake return springs and insures against premature actuation of the disc brakes; however, it is to be understood that the present invention contemplates the valve 52 opening at any master cylinder pressure equal to or greater than that required to overcome the drum brake return spring force. This is accomplished simply by varying the size of the spring 105. At this pressure (150 p.s.i.), the valve 52 opens so that fluid is delivered to the front wheel brake cylinders 35, 37 and pressurizes the disc brakes. Thereafter, the valve 52 alternately opens and closes as described above, and the pressure within the bore 51 and to the front wheel brake cylinders 35, 37 increases at a rate greater than the rate of increase of master cylinder or inlet pressure. This continues until the metering valve inlet and outlet pressures ($P_i$ and $P_o$) are equal which in this example occurs at about 580 p.s.i. At this point, the force of the spring 105 is completely overcome and the valve 52 remains open.

When it is desired to bleed the front brakes, the end of the push rod 71 extending through the plug 73 is manually operated to hold the valve disc 61 against the end wall 67 and away from the seal 113. In this position, the valve 52 remains open and fluid is freely transmitted therethrough to bleed the system.

By the foregoing, there has been provided an improved metering valve calculated to fulfill the objects hereinabove set forth, and while a preferred embodiment has been illustrated and described in detail hereinabove, various additions, substitutions, modifications and omissions may be made thereto without departing from the spirit of the invention as encompassed by the appended claims.

What is claimed is:

1. A metering valve for an automotive vehicle hydraulic brake system having disc brakes at one set of wheels and drum brakes at another set of wheels comprising a body having an inlet connected to a hydraulic pressure source and outlet means connected to said disc brakes, valve means in said body operable to block communication between said inlet and outlet means, differential pressure responsive means normally operable to hold said valve means open, said differential pressure responsive means being movable to effectuate closing of said valve means at a first level of pressure from said pressure source, said valve means being responsive to a second level of pressure from said pressure source to open said valve means whereby pressurization of said disc brakes above said first level is prevented until the pressure from said pressure source reaches said second level.

2. A metering valve for an automotive vehicle hydraulic brake system having disc brakes at one set of wheels and drum brakes at another set of wheels comprising a body having an inlet connected to a hydraulic pressure source and outlet means connected to said disc brakes, valve means including first and second valve elements in said body operable to block communication between said inlet and outlet means, differential pressure responsive means normally operable to hold said first and second valve elements spaced and said valve means open, said differential pressure responsive means being movable to permit said first and second valve elements to move relatively toward each other and effectuate closing of said valve means at a first level of pressure from said pressure source, said valve means being responsive to a second level of pressure from said pressure source to open said valve means whereby pressurization of said disc brakes above said first level is prevented until the pressure from said pressure source reaches said second level.

3. A metering valve for an automotive vehicle hydraulic brake system having disc brakes at one set of wheels and drum brakes at another set of wheels comprising a body having an inlet connected to a hydraulic pressure source and outlet means connected to said disc brakes, valve means including first and second valve elements movable in said body operable to block communication between said inlet and outlet means, means normally biasing said second valve element in a given direction, differential pressure responsive means normally operable to hold said first and second valve elements spaced and said valve means open, said differential pressure responsive means being movable to permit said first valve element to move toward said second valve element and effectuate closing of said valve means at a first level of pressure from said pressure source, said valve means being responsive to a second level of pressure from said pressure source to move said second valve element in a direction opposite to said given direction to open said valve means whereby pressurization of said disc brakes above said first level is prevented until the pressure from said pressure source reaches said second level.

4. A metering valve for an automotive vehicle hydraulic brake system having disc brakes at one set of wheels and drum brakes at another set of wheels comprising a body having an inlet connected to a hydraulic pressure source and outlet means connected to said disc brakes, valve means including first and second valve elements movable in said body operable to block communication between said inlet and outlet means, common seal means between said first and second valve elements and between said second valve element and said body, means normally biasing said second valve element in a given direction, differential pressure responsive means normally operable to hold said first and second valve elements spaced and said valve means open, said differential pressure responsive means being movable to permit said first valve element to move toward said second valve element and effectuate closing of said valve means at a first level of pressure from said pressure source, said valve means being responsive to a second level of pressure from said pressure source to move said second valve element in a direction opposite to said given direction to open said valve means whereby pressurization of said disc brakes above said first level is prevented until the pressure from said pressure source reaches said second level.

5. A metering valve for an automotive vehicle hydraulic brake system having disc brakes at one set of wheels and drum brakes at another set of wheels comprising a body having an inlet connected to a hydraulic pressure source and outlet means connected to said disc brakes, bore means connecting said inlet and outlet means, valve means including first and second valve elements movable in said bore means operable to block communication between said inlet and outlet means, differential pressure responsive means engaging said first valve element and normally holding it spaced from said second valve element and said valve means open, said pressure responsive means being movable to permit said first valve element to move toward said second valve element and close said valve means at a first level of pressure from said pressure source, resilient means engaging said second valve element and normally holding it in sealing relation against a shoulder in said bore means, said valve means being responsive to a second level of pressure from said pressure source to move said second valve element away from said shoulder whereby pressurization of said disc brakes above said first level is prevented until the pressure from said pressure source reaches said second level.

6. A metering valve for an automotive vehicle hydraulic brake system having disc brakes at one set of wheels and drum brakes at another set of wheels comprising a body having an inlet connected to a hydraulic pressure source and outlet means connected to said disc brakes, bore means connecting said inlet and outlet means, valve means including first and second valve elements movable in said bore means operable to block communication between said inlet and outlet means, rod means slidable in said bore means and engaging said first valve element, a molded diaphragm having one end fixed to said rod means and the other end fixed in said bore means, said diaphragm having a resilient portion connecting said ends and operable to normally hold said first valve element spaced from said second valve element and said valve means open, said diaphragm resilient portion being flexible to move said rod means away from said first valve element to permit it to move toward said second valve element and close said valve means at a first level of pressure from said pressure source, spring means in said bore means engaging said second valve element and normally holding it in sealing relation against a shoulder in said bore means, said valve means being responsive to a second level of pressure from said pressure source to move said second valve element away from said shoulder whereby pressurization of said disc brakes above said first level is prevented unit the pressure from said pressure source reaches said second level.

7. A metering valve for an automotive vehicle hydraulic brake system having disc brakes at one set of wheels and drum brakes at another set of wheels comprising a body having an inlet connected to a hydraulic pressure source and outlet means connected to said disc brakes, vertical bore means connecting said inlet and outlet means, valve means including first and second valve elements movable in said bore means operable to block communication between said inlet and outlet means, rod means slidable vertically in said bore means and engaging said first valve element, a molded diaphragm having one end fixed to said rod means and the other end fixed in said bore means, said diaphragm having a resilient portion connecting said ends adapted to normally hold said first valve element spaced from said second valve element and said valve means open, said diaphragm resilient portion being flexible to move said rod means away from said first valve element to permit it to move by gravity toward said second valve element and close said valve means at a first level of pressure from said pressure source, spring means in said bore means engaging said second valve element and normally holding it in sealing relation against a shoulder in said bore means, said valve means being responsive to a second level of pressure from said pressure source to move said second valve element away from said shoulder whereby pressurization of said disc brakes above said first level is prevented until the pressure from said pressure source reaches said second level.

8. A metering valve for an automotive vehicle hydraulic brake system having disc brakes at one set of wheels and drum brakes at another set of wheels comprising a body having an inlet connected to a hydraulic pressure source and outlet means connected to said disc brakes, bore means connecting said inlet and outlet means, valve means including first and second valve elements movable in said bore means operable to block communication between said inlet and outlet means, a sealing ring carried by said second valve element, passage means in said second valve element, differential pressure responsive means engaging said first valve element and normally holding it spaced from said second valve element and said valve means open, said pressure response means being movable away from said first valve element to permit it to move toward said second valve element and engage said sealing ring to close said passage means and said valve means at a first level of pressure from said pressure source, spring means in said bore means engaging said second valve element and normally holding said sealing ring in sealing relation against a shoulder in said bore means, said valve means being responsive to a second level of pressure from said pressure source to move said second valve element and said sealing ring away from said shoulder whereby pressurization of said disc brakes aboves said first level is prevented until the pressure from said pressure source reaches said second level.

9. A metering valve for an automotive vehicle hydraulic brake system having disc brakes at one set of wheels and drum brakes at another set of wheels comprising a body having an inlet connected to a hydraulic pressure source and a pair of outlets connected to said disc brakes, respectively, bore means connecting said inlet and outlets, valve means including first and second valve elements movable in said bore means operable to block communication between said inlet and outlet means, differential pressure responsive means engaging said first valve element and normally holding it spaced from said second valve element and said valve means open, said pressure responsive means being movable away from said first valve element to permit it to move toward said second valve element and close said valve means at a first level of pressure from said pressure source, spring means in said bore means engaging said second valve element and normally holding it in sealing relation against a shoulder in said bore means, said valve means being responsive to a second level of pressure from said pressure source to move said second valve element away from said shoulder whereby pressurization of said disc brakes above said first level is prevented until the pressure from said pressure source reaches said second level.

10. A metering valve for an automotive vehicle hydraulic brake system having disc brakes at one set of wheels and drum brakes at another set of wheels comprising a body having an inlet connected to a hydraulic pressure source and outlet means connected to said disc brakes, bore means connecting said inlet and outlet means, valve means including first and second valve elements movable in said bore means operable to block communication between said inlet and outlet means, said first valve element having restricted passageway means, differential pressure responsive means engaging said first valve element and normally holding it spaced from said second valve element and said valve means open, said restricted passageway means being operable to cause a pressure drop across said first valve element upon rapid delivery of fluid from said pressure source to said bore to cause said first valve element to move toward said second valve element and close said valve means, said pressure responsive means being movable away from said first valve element to permit it to move toward said second valve element and close said valve means at a first level of pressure from said pressure source, spring means in said bore means engaging said second valve element and normally holding it in sealing relation against a shoulder in said bore means, said valve means being responsive to a second level of pressure from said pressure source to move said second valve element away from said shoulder whereby pressurization of said disc brakes above said first level is prevented until the pressure from said pressure source reaches said second level.

11. A metering valve for an automotive vehicle hydraulic brake system having disc brakes at one set of wheels and drum brakes at another set of wheels comprising a body having an inlet connected to a hydraulic pressure source and outlet means connected to said disc brakes, valve means in said body operable to block communication between said inlet and outlet means, differential pressure responsive means normally operable to hold said valve means open, said differential pressure responsive means being movable to effectuate closing of said valve means at a first level of pressure from said pressure source, said valve means being responsive to a second level of pressure from said pressure source to open said valve means whereby pressurization of said disc brakes above said first level is prevented until the pressure from said pressure source reaches said second level, said valve means being responsive to pressure in said bore whereby to open said valve means upon release of pressure from said pressure source.

12. A metering valve for an automotive vehicle hydraulic brake system having disc brakes at one set of wheels and drum brakes at another set of wheels comprising a body having an inlet connected to a hydraulic pressure source and outlet means connected to said disc brakes, valve means including first and second valve elements in said body operable to block communication between said inlet and outlet means, differential pressure responsive means normally operable to hold said first and second valve elements spaced and said valve means open, said differential pressure responsive means being movable to permit said first and second valve elements to move relatively toward each other and effectuate closing of said valve means at a first level of pressure from said pressure source, said valve means being responsive to a second level of pressure from said pressure source to open said valve means whereby pressurization of said disc brakes above said first level is prevented until the pressure from said pressure source reaches said second level, means providing fluid communication between said first valve element and said bore means whereby said first valve element is moved away from said second valve element upon releasing pressure from said pressure source.

13. A metering valve for an automotive vehicle hydraulic brake system having disc brakes at one set of wheels and drum brakes at another set of wheels comprising a body having an inlet connected to a hydraulic pressure source and outlet means connected to said disc brakes, bore means connecting said inlet and outlet means, valve means including first and second valve elements movable in said bore means operable to block communication between said inlet and outlet means, differential pressure responsive means engaging said first valve element and normally holding it spaced from said second valve element and said valve means open, said pressure responsive means being movable to permit said first valve element to move toward said second valve element and close said valve means at a first level of pressure from said pressure source, resilient means engaging said second valve element and normally holding it in sealing relation against a shoulder in said bore means, said valve means being responsive to a second level of pressure from said pressure source to move said second valve element away from said shoulder whereby pressurization of said disc brakes above said first level is prevented until the pressure from said pressure source reaches said second level, passage means through said second valve element providing fluid communication between said bore and said first valve element whereby said first valve element is moved away from said second valve element to open said valve means when pressure from said pressure source is released.

14. A metering valve for an automotive vehicle hydraulic brake system having disc brakes at one set of wheels and drum brakes at another set of wheels comprising a body having an inlet connected to a hydraulic pressure source and outlet means connected to said disc brakes, bore means connecting said inlet and outlet means, valve means including first and second valve elements movable in said bore means operable to block communication between said inlet and outlet means, a sealing ring carried by said second valve element, first passage means in said second valve element, differential pressure responsive means engaging said first valve element and normally holding it spaced from said second valve element and said valve means open, said pressure responsive means being movable away from said first valve element to permit it to move toward said second valve element and engage said sealing ring to close said first passage means and said valve means at a first level of pressure from said pressure source, spring means in said bore means engaging said second valve element and normally holding said sealing ring in sealing relation against a shoulder in said bore means, said valve means being responsive to a second level of pressure from said pressure source to move said second valve element and said sealing ring away from said shoulder whereby pressurization of said disc brakes above said first level is prevented until the pressure from said pressure source reaches said second level, and second passage means in said second valve element providing fluid communication between said bore means and said first valve element whereby to move said first valve element away from said second valve element and open said valve means upon release of pressure from said pressure source.

*15. A metering valve for an automotive vehicle hydraulic brake system having disc brakes at one set of wheels operable at a first preselected hydraulic pressure, and drum brakes at another set of wheels operable at a second preselected hydraulic pressure in excess of the first preselected pressure, said valve comprising:*

*a body having an inlet connected to a hydraulic pressure source and outlet means connected to said disc brakes,*

*valve means in said body operable to block communication between said inlet and outlet means,*

*differential pressure responsive means normally operable to hold said valve means open,*

*said differential pressure responsive means being movable to effectuate closing of said valve means at a first level of pressure from said pressure source,*

*said valve means being responsive to a second level of pressure from said pressure source approximately equal to said second preselected pressure to open said valve means, whereby pressurization of said disc brakes above said first level is prevented until the pressure from said pressure source reaches said second level so that said disc brakes will not be actuated before actuation of said drum brakes.*

*16. A metering valve for an automotive vehicle hydraulic brake system having disc brakes at one set of wheels and drum brakes at another set of wheels, with the drum brakes being actuatable at a higher hydraulic pressure than the disk brakes, the metering valve being operable to prevent actuation of said disc brakes until the hydraulic pressure supplied to the disc brakes from a source thereof is approximately equal to the hydraulic pressure at which the drum brakes are actuatable, the valve comprising:*

*a body having an inlet connected to a hydraulic pressure source and outlet means connected to said disc brakes,*

*valve means including first and second valve elements in said body operable to block communication between said inlet and outlet means, differential pressure responsive means normally operable to hold said first and second valve elements spaced and said valve means open,*

*said differential pressure responsive means being movable to permit said first and second valve elements to move relatively toward each other and effectuate closing of said valve means at a first level of pressure from said pressure source,*

*said valve means being responsive to a second level of pressure from said pressure source to open said valve means, whereby pressurization of said disc brakes is prevented until the pressure supplied to said disk brakes is approximately the same pressure at which said drum brakes are actuatable.*

*17. The invention as set forth in claim 15 wherein the drum brakes are provided with return springs, and wherein the second preselected pressure is approximately equal to the pressure required to overcome the force of said return springs.*

*18. The invention as set forth in claim 16 which includes resilient means for maintaining said first and second valve elements in relatively separated condition, whereby to maintain said valve means open.*

*19. The invention as set forth in claim 18 wherein said resilient means is generally deformable in order to permit said first and second valve elements to effect closing of said valve means.*

*20. The invention as set forth in claim 16 wherein said body is formed with an elongated bore communicating said inlet and outlet means, which includes an elongated, generally cylindrical rod means extending axially within said bore, said rod means being operatively associated with said valve means wherein one of said valve members is movable toward and away from the other of said valve members in response to preselected axial movement of said rod means relative to said body.*

*21. The invention as set forth in claim 20 which includes resilient means which is yieldable axially of said bore and cooperable with said rod means for yieldably maintaining said rod means in a preselected axial position within said bore.*

*22. The invention as set forth in claim 21 wherein said rod means is movable between first and second axially displaced positions within said bore and wherein said resilient means yieldably maintains said rod means in one of said positions and is axially deformable to permit said rod means to move toward the other of said axial positions.*

*23. The invention as set forth in claim 22 wherein said resilient means comprises resilient flexible diaphragm means having a first portion fixed relative to said body and a second portion fixed relative to said rod means and a third relatively flexible portion.*

*24. The invention as set forth in claim 23 wherein said second portion of said diaphragm means extends generally axially of said rod means and is fixedly secured thereto, wherein said third portion of said diaphragm means extends between said first and second portions thereof and is adapted to yield axially of said bore means upon movement of said rod means between said first and second axially displaced positions.*

*25. The invention as set forth in claim 24 wherein said diaphragm means is of a generally circular configuration and wherein said flexible third portion thereof extends generally radially of said bore means.*

*26. The invention as set forth in claim 24 wherein said diaphragm means normally assumes a first configuration yieldably maintaining said rod means in one of said axial positions and is deformable to a second configuration in response to a preselected increase in pressure within said bore means to effect movement of said rod means toward said second axial position.*

*27. The invention as set forth in claim 26 wherein said valve means is open when said rod means is in one of said axial positions and is closed when said rod means is in the other of said axial positions.*

*28. The invention as set forth in claim 24 wherein the cross-sectional size of said third portion of said diaphragm means is relatively larger than the size of said rod means, and wherein said diaphragm means is deformable in response to a preselected pressure increase in said bore means to effect axial movement of said rod means, whereby said rod means is movable axially within said bore means upon a relatively small increase in fluid pressure within said bore means.*

*29. The invention as set forth in claim 16 which includes resilient means for maintaining said first and second valve elements in relatively separated condition, whereby to maintain said valve means open.*

*30. The invention as set forth in claim 29 wherein said resilient means is generally deformable in order to permit said first and second valve elements to effect closing of said valve means.*

*31. The invention as set forth in claim 30 wherein said body is formed with an elongated bore communicating said inlet and outlet means, which includes an elongated, generally cylindrical rod means extending axially within said bore, said rod means being operatively associated with said valve means wherein one of said valve members is movable toward and away from the other of said valve members in response to preselected axial movement of said rod means relative to said body.*

*32. The invention as set forth in claim 31 which includes resilient means which is yieldable axially of said bore and cooperable with said rod means for yieldably maintaining said rod means in a preselected axial position within said bore.*

*33. The invention as set forth in claim 32 wherein said rod means is movable between first and second axially displaced positions within said bore and wherein said resilient means yieldably maintains said rod means in one of said positions and is axially deformable to permit said rod means to move toward the other of said axial positions.*

*34. The invention as set forth in claim 33 wherein said resilient means comprises resilient flexible diaphragm means having a first portion fixed relative to said body and a second portion fixed relative to said rod means and a third relatively flexible portion.*

*35. The invention as set forth in claim 34 wherein said second portion of said diaphragm means extends generally axially of said rod means and is fixedly secured thereto, wherein said third portion of said diaphragm means extends between said first and second portions thereof and is adapted to yield axially of said bore means upon movement of said rod means between said first and second axially displaced positions.*

*36. The invention as set forth in claim 35 wherein said diaphragm means is of a generally circular configuration and wherein said flexible third portion thereof extends generally radially of said bore means.*

*37. The invention as set forth in claim 36 wherein said diaphragm means normally assumes a first configuration yieldably maintaining said rod means in one of said axial positions and is deformable to a second configuration in response to a preselected increase in pressure within said bore means to effect movement of said rod means toward said second axial position.*

*38. The invention as set forth in claim 37 wherein said valve means is open when said rod means is in one of said axial positions and is closed when said rod means is in the other of said axial positions.*

*39. The invention as set forth in claim 38 wherein the cross sectional size of said third portion of said diaphragm means is relatively larger than the size of said rod means, and wherein said diaphragm means is deformable in response to a preselected pressure increase in said bore means to effect axial movement of said rod means, whereby said rod means is movable axially within said bore means upon a relatively small increase in fluid pressure within said bore means.*

References Cited

The following references, cited by the Examiner, are of record in the patented file of this patent or the original patent.

UNITED STATES PATENTS

| | | | |
|---|---|---|---|
| 3,304,130 | 2/1967 | Doerfler | 303—6 C |
| 3,314,334 | 12/1968 | Payne | 303—6 C |
| 3,526,437 | 9/1970 | Lewis | 303—6 C |

DUANE A. REGER, Primary Examiner

D. C. BUTLER, Assistant Examiner

U.S. Cl. X.R.

188—349

UNITED STATES PATENT OFFICE

CERTIFICATE OF CORRECTION

PATENT NO. : Re. 28,253

DATED : November 26, 1974

INVENTOR(S) : William Stelzer

It is certified that error appears in the above-identified patent and that said Letters Patent are hereby corrected as shown below:

Column 2, line 25, "wheel" should be --wheels--. Column 3, line 52, "69" should be --59--. Column 4, line 55, "pointed" should be --positioned--. Column 5, line 74, "fore" should be --force--. Column 6, line 42, "ocurs" should be --occurs--.

This certificate supersedes Certificate of Correction issued May 13, 1975.

Signed and Sealed this

*second* Day of *December 1975*

[SEAL]

*Attest:*

RUTH C. MASON
*Attesting Officer*

C. MARSHALL DANN
*Commissioner of Patents and Trademarks*